(12) United States Patent
Majeskie et al.

(10) Patent No.: US 10,279,791 B2
(45) Date of Patent: May 7, 2019

(54) SYSTEMS FOR RETARDING THE SPEED OF A RAILCAR

(71) Applicant: Precision Rail and MFG., Inc., Oak Creek, WI (US)

(72) Inventors: Gerard R. Majeskie, Waukesha, WI (US); Robert R. Meade, Kenosha, WI (US); Kurtis James Opelt, Germantown, WI (US); Neal W. Becker, Greenfield, WI (US)

(73) Assignee: Precision Rail and Mfg., Inc., Oak Creek, WI (US)

( * ) Notice: Subject to any disclaimer, the term of this patent is extended or adjusted under 35 U.S.C. 154(b) by 0 days.

(21) Appl. No.: 15/831,648

(22) Filed: Dec. 5, 2017

(65) Prior Publication Data

US 2018/0093654 A1    Apr. 5, 2018

Related U.S. Application Data

(63) Continuation of application No. 14/555,088, filed on Nov. 26, 2014, now Pat. No. 9,862,368.

(60) Provisional application No. 61/951,151, filed on Mar. 11, 2014.

(51) Int. Cl.

| | |
|---|---|
| *B60T 13/68* | (2006.01) |
| *B61H 13/00* | (2006.01) |
| *B61H 5/00* | (2006.01) |
| *B60T 13/66* | (2006.01) |
| *B60T 17/22* | (2006.01) |
| *F16D 63/00* | (2006.01) |
| *F16D 71/00* | (2006.01) |
| *B61K 7/02* | (2006.01) |

(52) U.S. Cl.
CPC ......... *B60T 13/686* (2013.01); *B60T 13/665* (2013.01); *B60T 17/228* (2013.01); *B61H 5/00* (2013.01); *B61H 13/00* (2013.01); *F16D 63/008* (2013.01); *F16D 71/00* (2013.01); *B61K 7/02* (2013.01)

(58) Field of Classification Search
CPC ......... B61H 13/00; B61K 7/02; B60T 13/686; B60T 13/665; B60T 17/228
USPC ......... 188/62; 104/249, 240, 251, 252, 26.2, 104/256; 303/10, 11
See application file for complete search history.

(56) References Cited

U.S. PATENT DOCUMENTS

| | | | |
|---|---|---|---|
| 2,014,551 | A | 9/1935 | Bone et al. |
| 3,200,245 | A | 8/1965 | Brown |
| 3,227,246 | A | 1/1966 | Wilson |
| 3,519,107 | A | 7/1970 | Bellinger |
| 3,557,910 | A | 1/1971 | Wilson |
| 3,621,942 | A | 11/1971 | Danieli |
| 3,809,188 | A | 5/1974 | Frank et al. |
| 3,827,533 | A | 8/1974 | Noble |

(Continued)

FOREIGN PATENT DOCUMENTS

EP    1 122 144 A1    8/2001

*Primary Examiner* — Thomas W Irvin
(74) *Attorney, Agent, or Firm* — Andrus Intellectual Property Law, LLP

(57) ABSTRACT

A system for retarding the speed of a railcar comprises a brake; a hydraulic actuator moving the brake between a closed position in which the brake applies braking pressure on the wheel of a railcar, and an open position in which the brake does not apply braking pressure on the wheel of the railcar; a hydraulic circuit provided with a pump arrangement for supplying hydraulic fluid to the hydraulic actuator; and a control circuit coupled to the hydraulic circuit for controlling the flow of hydraulic fluid to move the brake between the closed and open positions.

29 Claims, 13 Drawing Sheets

(56) References Cited

U.S. PATENT DOCUMENTS

| | | |
|---|---|---|
| 3,926,124 A | 12/1975 | Frank |
| 3,946,973 A | 3/1976 | Budway et al. |
| 4,027,595 A | 6/1977 | Frank et al. |
| 4,098,374 A | 7/1978 | Frank |
| 4,113,621 A | 9/1978 | Frank et al. |
| 4,125,177 A | 11/1978 | Durraffourt |
| 4,198,909 A | 4/1980 | Plantureux |
| 4,235,403 A | 11/1980 | Gillen et al. |
| 4,307,916 A | 12/1981 | Straut et al. |
| 4,393,960 A | 7/1983 | Mazur et al. |
| 4,480,723 A | 11/1984 | Ingvast et al. |
| 4,650,038 A | 3/1987 | Bick |
| 4,766,815 A | 8/1988 | Chongben et al. |
| 4,867,279 A | 9/1989 | Link et al. |
| 4,967,511 A | 11/1990 | Werginz et al. |
| 4,996,793 A | 3/1991 | Mazur |
| 5,092,248 A | 3/1992 | Parry |
| 5,388,525 A | 2/1995 | Bodkin |
| 5,493,086 A | 2/1996 | Murphy et al. |
| 5,494,342 A | 2/1996 | Engle |
| 5,676,337 A | 10/1997 | Giras et al. |
| 5,730,260 A | 3/1998 | Thyssen |
| RE36,036 E | 1/1999 | Engle |
| 5,904,321 A | 5/1999 | Cox et al. |
| 6,152,042 A | 11/2000 | Barry et al. |
| 6,199,671 B1 | 3/2001 | Thyssen |
| 6,216,525 B1 | 4/2001 | Bernd et al. |
| 6,422,519 B1 | 7/2002 | Braatz |
| 7,140,698 B2 | 11/2006 | Braatz et al. |
| 7,306,077 B2 | 12/2007 | Heyden et al. |
| 7,325,567 B2 | 2/2008 | Heyden et al. |
| 7,392,887 B2 | 7/2008 | Heyden et al. |
| 8,413,770 B1 | 4/2013 | Heyden et al. |
| 8,499,900 B1 | 8/2013 | Heyden et al. |
| 2003/0107028 A1 | 6/2003 | Martin |
| 2006/0225968 A1 | 10/2006 | Heyden et al. |
| 2008/0237511 A1 | 10/2008 | Heyden et al. |
| 2011/0315491 A1 | 12/2011 | Frailing et al. |

SYSTEMS FOR RETARDING THE SPEED OF A RAILCAR

CROSS REFERENCE TO RELATED APPLICATION

The present application is a continuation of U.S. patent application Ser. No. 14/555,088, filed Nov. 26, 2014. The '088 application claims priority to and the benefit of U.S. Provisional Patent Application Ser. No. 61/951,151 filed Mar. 11, 2014 which are both incorporated herein in entirety.

FIELD

The present disclosure relates generally to retarders of the kind suitable for reducing the speed of a railcar riding along a set of rails.

BACKGROUND

U.S. Pat. No. 4,393,960, the disclosure of which is hereby incorporated herein by reference in entirety, discloses a brake shoe structure that includes a series of alternating long brake shoes and short brake shoes mountable on adjacent brake beams in a railroad car retarder. The length of the long brake shoe is such that the long brake shoe symmetrically straddles two adjacent brake beams. The length of the short brake shoe is such that the shoe occupies the spacing on the brake beams between two long brake shoes. The long brake shoes are affixable to each of the brake beams in at least two locations. The brake shoes contain a plurality of slanting slots in their braking surfaces for interrupting harmonics producing screeching noises during retardation. The brake shoes may be formed of steel or heat treatable ductile iron.

U.S. Pat. No. 7,140,698, the disclosure of which is hereby incorporated herein by reference in entirety, discloses a hydraulic control and operating system for a railroad car retarder to control the movement of railroad cars in a railroad classification yard. The system utilizes a double-acting hydraulic cylinder to operate the retarder mechanism and includes a hydraulic control circuit that provides protection against pressure spikes and high pressure excursions, high and low temperature excursions, low oil levels and oil filter fouling. The system shuts itself down to prevent damage, and provides a warning to maintenance staff that service should be performed long before a need for system shut-down is required. The system includes a central operating panel in the rail yard control center, a remote control panel located at the position of the retarder, and the system can be connected for operation from a completely remote location.

U.S. Pat. No. 8,413,770, the disclosure of which is hereby incorporated herein by reference in entirety, discloses systems for and methods of operating electro-hydraulic retarders. In one example, a system is provided for retarding the speed of a railcar. The system includes a brake, a hydraulic actuator coupled to the brake, and a hydraulic circuit that directs pressurized hydraulic fluid to the actuator. The fluid causes the actuator to move the brake towards a closed position in which the brake will apply a predetermined braking pressure on a wheel of the railcar. A hydraulic accumulator is coupled to the hydraulic circuit and configured to accumulate fluid from the hydraulic circuit when the wheel forces the brake out of the closed position and to supply pressurized accumulated fluid back to the hydraulic circuit when the brake moves back into the closed position to thereby maintain a substantially constant braking pressure on the wheel of the railcar as it moves through the brake.

U.S. Pat. No. 8,499,900, the disclosure of which is hereby incorporated herein by reference in entirety, discloses electro-hydraulic retarders designed to allow opposing brake shoes on the retarder to spread to the width of a wheel entering the retarder, and yet still maintain a desired braking pressure on the sides of the wheel. In one example, the retarder includes a brake and a brake actuator that has a piston-cylinder and a spring. One or both of the piston and the cylinder acts on the brake and the other of the piston and the cylinder acts on one end of the spring. The other end of the spring acts on the brake. In one example, the spring is wrapped around the cylinder and connected thereto in series. In such an arrangement, supplying pressurized hydraulic fluid to the piston-cylinder causes both the piston-cylinder and the spring to move the brake towards a closed position in which the brake will apply a predetermined braking pressure on a wheel of the railcar. The spring resiliently biases the brake into the closed position to maintain a substantially constant braking pressure on the wheel of the railcar as it moves through the retarder.

U.S. Patent Application Publication No. 2011/0315491, the disclosure of which is hereby incorporated herein by reference in entirety, discloses systems for retarding the speed of a railcar. In one example, a hydraulic actuator moves a brake between a closed position in which the brake applies braking pressure on a railcar wheel, and an open position in which the brake does not apply braking pressure on the railcar wheel. A pump supplies hydraulic fluid into at least one of a first manifold and a second manifold of a hydraulic circuit. A logic element reacts to maintaining a selected pressure in the first manifold when a railcar wheel enters a brake and moves the brake from the closed position to the open position to cause a selected braking pressure to be applied to the railcar wheel. A control circuit controls the logic element to apply the selected braking pressure on the railcar wheel.

SUMMARY

The present disclosure arises from the present inventors' research and development of electro-hydraulic systems for retarding the speed of a railcar traveling on a set of rails. The inventors have recognized that more efficient and effective electro-hydraulic retarder systems and methods of operating such systems are needed in the art. For example, in current electro-hydraulic retarder systems, when a wheel enters the system, the system is ideally capable of allowing the brake shoes to spread apart to the width of the wheel and yet still maintain a desired pressure on the side of the wheel. The system ideally also allows for quick application and removal of pressure on the sides of the wheel. However, the present inventors have realized that because hydraulic fluids are generally incompressible, it is difficult to use hydraulics to power the system in such a way that the brake shoes will quickly spread apart to accept an entering wheel and conform to various widths of railcar wheels while maintaining consistent pressure on the sides of the wheel. Through research and development, the inventors have invented the systems and methods disclosed herein, which overcome many of these deficiencies in the prior art.

In one example, a system for retarding the speed of a railcar comprises a brake; a hydraulic actuator moving the brake between a closed position in which the brake applies braking pressure on a wheel of the railcar, and an open position in which the brake does not apply braking pressure on the wheel of the railcar; a hydraulic circuit configured with a first manifold and a second manifold, and provided with a pump arrangement for supplying hydraulic fluid to the hydraulic actuator; and a control circuit coupled to the hydraulic circuit for controlling the flow of hydraulic fluid to move the brake between the closed position and the open position, wherein the pump arrangement includes a first pump and a second pump, the first pump being used in providing powered movement of the brake to the closed position and at least the second pump being used in providing powered movement of the brake to the open position, and wherein the control circuit and the hydraulic circuit are configured to provide a non-powered movement of the brake to the open position.

In another example, a hydraulic accumulator is connected to the pump arrangement, wherein the pump arrangement is periodically energized to charge the accumulator so that, upon a de-energization of the pump arrangement, the hydraulic accumulator provides pressurized hydraulic fluid which is used to provide movement of the brake to the closed position.

In a further example, the hydraulic actuator includes a piston disposed in a cylinder, wherein pressurized hydraulic fluid enables the piston to extend from the cylinder into an extended position to move the brake into the closed position, and wherein pressurized hydraulic fluid enables the piston to retract into the cylinder in a retracted position to move the brake to the open position. The piston defines an orifice therethrough in communication with a check valve, and wherein the orifice and the check valve facilitate flushing of hydraulic fluid from a rod-side of the cylinder to a cap-side of the cylinder when the piston is moved from the extended position to the retracted position.

In an additional example, the hydraulic circuit includes a pressure controlling arrangement responsive to different signals from the control circuit for selecting and maintaining a selected system pressure of the hydraulic fluid in the hydraulic circuit, and an anti-cavitation check valve connected to the pressure controlling arrangement. When the wheel enters the brake and forces the brake towards the open position, the pressure controlling arrangement reacts to an increase in the pressure of the hydraulic fluid, and directs an amount of hydraulic fluid to the reservoir to avoid overpressurization and maintain the selected system pressure, and the check valve directs a portion of the hydraulic fluid directed to the reservoir to a rod-side of the cylinder to prevent cavitation during a rapid movement of the piston rod.

Further examples are provided herein and will be described hereinafter with reference to the following drawing figures.

DETAILED DESCRIPTION OF THE DRAWINGS

In the present disclosure, certain terms have been used for brevity, clearness and understanding. No unnecessary limitations are to be implied therefrom beyond the requirement of the prior art because such terms are used for descriptive purposes only and are intended to be broadly construed. The different systems and methods described herein may be used alone or in combination with other systems and methods. Various equivalents, alternatives and modifications are possible within the scope of the appended claims.

Figure 1:
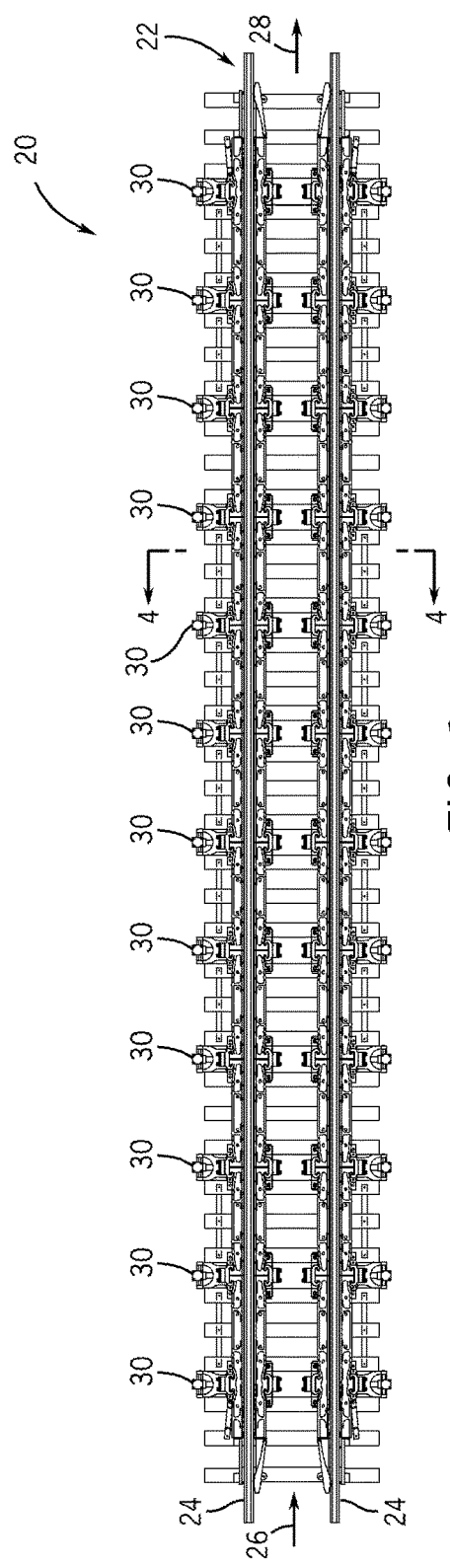
FIG. 1 is a plan view of a pair of rails and a retarder system for reducing the speed of a railcar riding on the rails.
Figure 2:
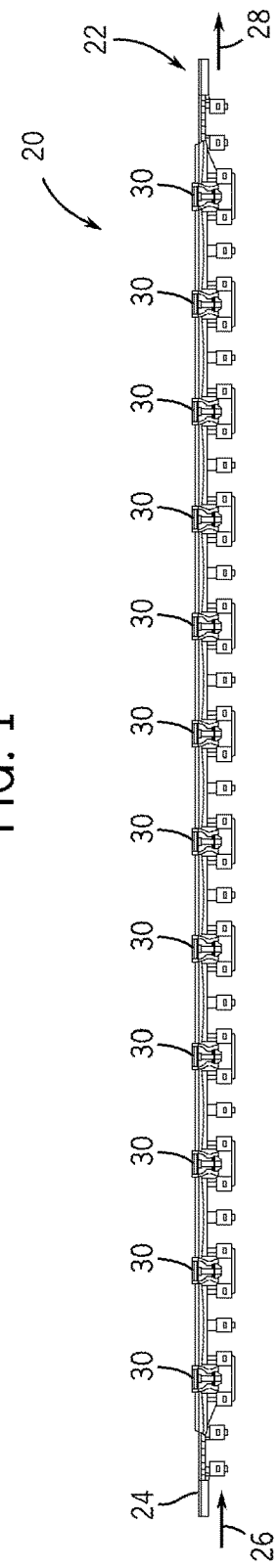
FIG. 2 is a side view of the pair of rails and retarder system depicted in FIG. 1.

FIGS. 1 and 2 depict a railcar retarder system 20 that is mounted along a section of track 22, including a pair of conventional rails 24. The section of track 22 continues in both directions from the system 20 with railcars entering the system 20 from the left in the direction shown by arrow 26 and exiting to the right in the direction shown by arrow 28. The retarder system 20 includes a series of pairs of brakes 30 positioned on opposite sides of each of the rails 24. The brakes 30 are positioned alongside and on top of the rails 24 such that, when actuated, the brakes 30 engage the sides of the railcar wheels to brake or retard the moving railcar. Although the particular example shown depicts a two series 29a, 29b (see FIG. 3) of six pairs of brakes 30, it should be recognized that the number and arrangement of the brakes 30 can vary from that shown depending upon various operational parameters. In the example shown, each series 29a, 29b includes six pairs of brakes 30 that are connected in series to a power unit comprising a hydraulic circuit 32. In use, each hydraulic circuit 32 receives and directs pressurized hydraulic fluid to the brakes 30 to actuate the brakes 30, as is further discussed herein below.

Figure 3:
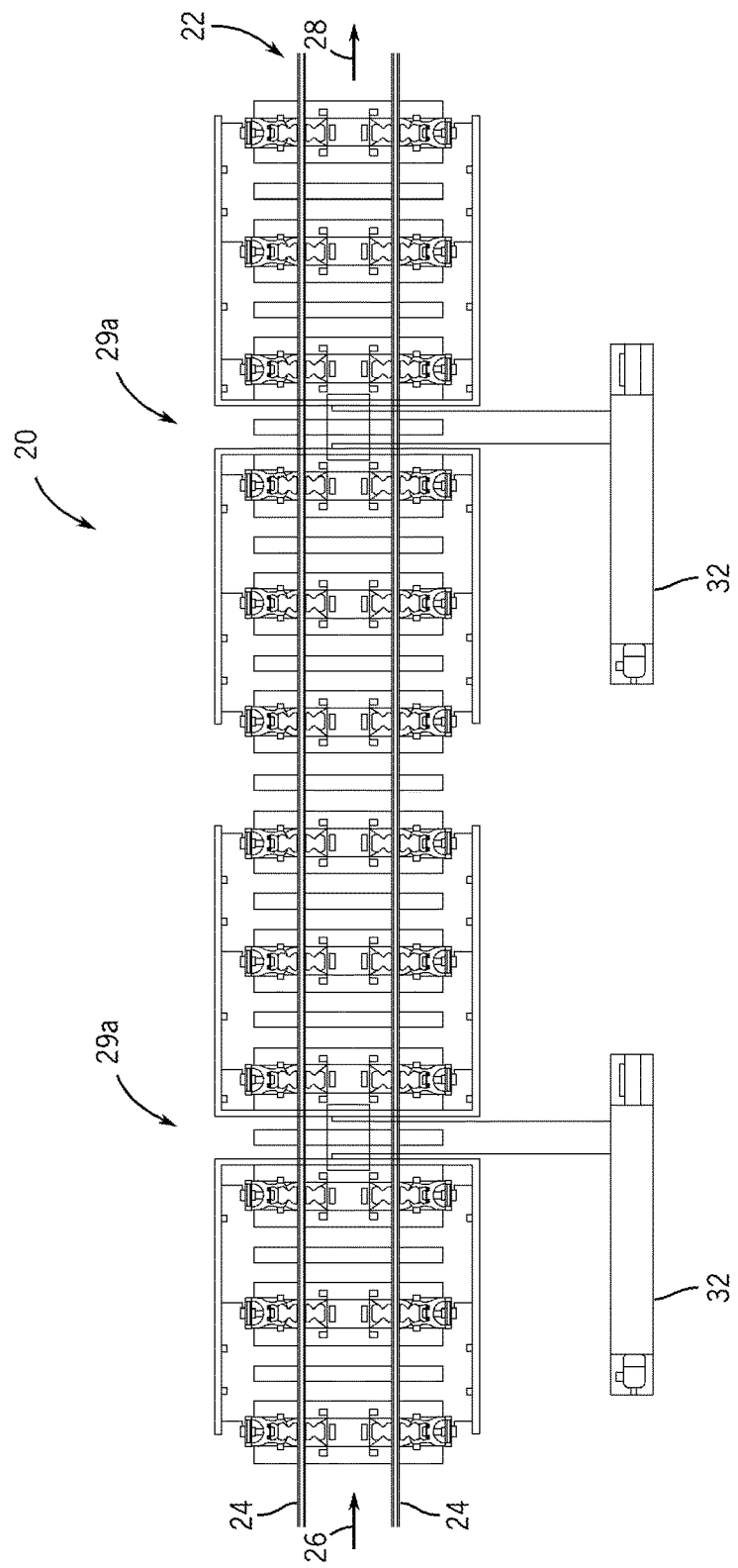
FIG. 3 is a plan view of the pair of rails shown in FIG. 1, further depicting hydraulic systems for operating the retarder system.

FIG. 3 is a view showing the retarder system 20 and more particularly showing the hydraulic circuit 32. Portions of the brakes 30 are omitted to more clearly show the hydraulic circuit 32.

Figure 4:
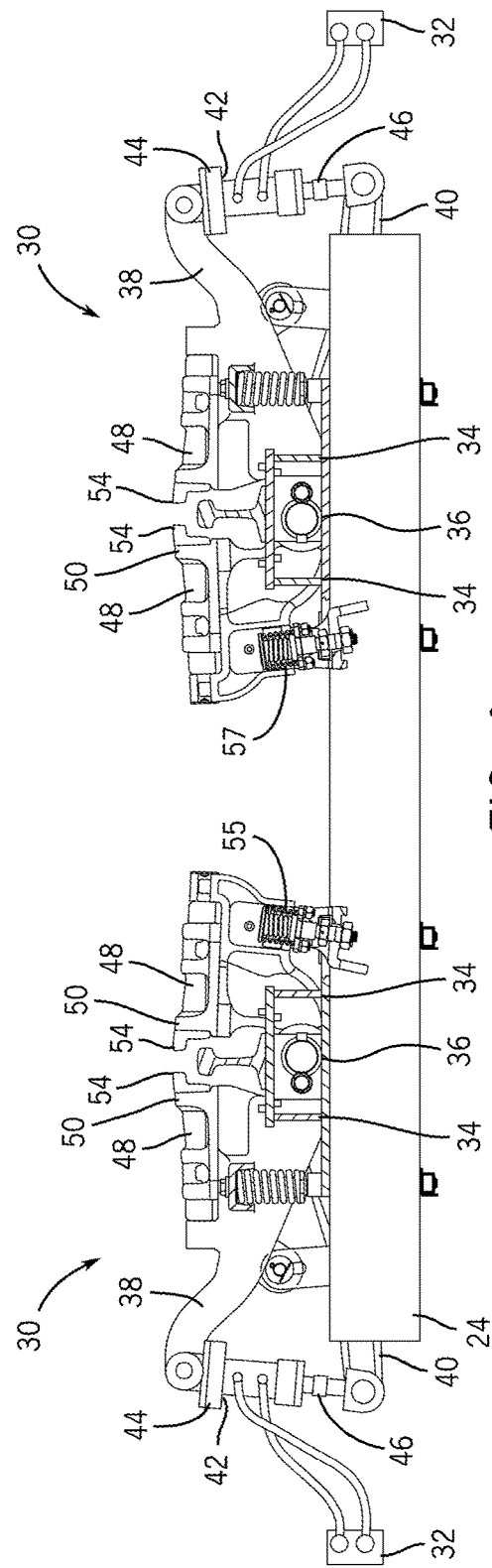
FIG. 4 is a sectional view taken through Section 4-4 in FIG. 1 showing a brake.

FIG. 4 depicts Section 4-4 of FIG. 1. FIG. 4 is representative of each pair of brakes 30 in the retarder system 20. Generally, each brake 30 includes rail supports 34 to which a rail 24 is secured. Each rail support 32 contains a fulcrum pin 36 supporting upper and lower levers 38, 40, which together function as a brake 30. The fulcrum pin 36 passes through an end of upper lever 38 and also through a center portion of lower lever 40. A brake beam 48 is secured to each of the levers 38, 40. The position of the brake beam 48 on the levers 38, 40 can be adjusted by an adjustment mechanism extending through flanges on the lever arms, according to known arrangements such as those described in U.S. Pat. No. 4,393,960. Brake shoes 50 are mounted on the brake beams 48. The brake shoes 50 are generally L-shaped, having a short arm containing braking surface 54 supported by a flange mounted to the brake beam 48. The hydraulic circuit 32 is connected to a hydraulic actuator, which is movable under hydraulic forces to move the retarder between the open and closed positions. Different types of hydraulic actuators could be used, such as for example a plunger cylinder and/or the like. In the particular example shown, the actuator includes a hydraulic piston-cylinder 42 having a cylinder 44 connected to the end of one of the levers 38, 40 and a piston-rod 46 connected to the other.

Figure 6:
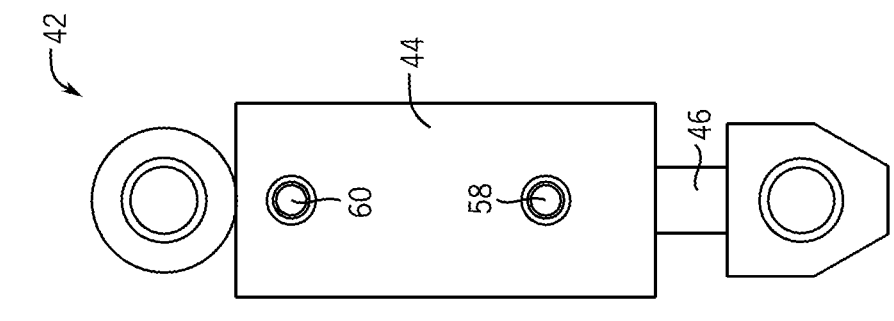
FIG. 6 is a side view of the actuator.
Figure 5:
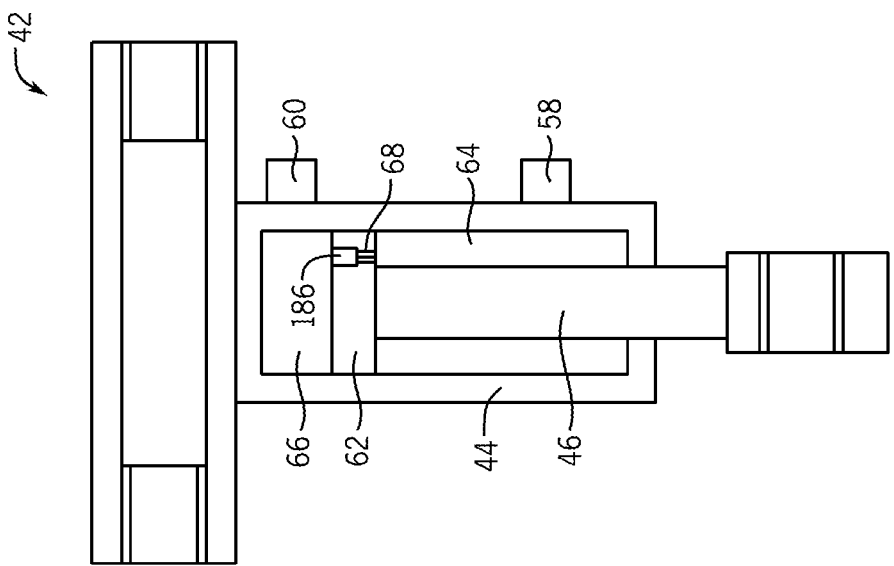
FIG. 5 is a sectional view of an actuator, including a piston, piston-rod and cylinder.

FIGS. 5 and 6 show a sectional view and side view, respectively, of an exemplary piston-cylinder 42. The piston-cylinder 42 includes a pair of hydraulic ports including a rod-side port 58 and a cap-side port 60. A piston 62 is disposed on the internal end of the piston-rod 46 and divides the cylinder 44 into two chambers 64, 66, including a rod-side chamber 64 and a cap-side chamber 66. The piston 62 is connected to piston-rod 46, which extends from the piston-cylinder 42. Rod-side hydraulic port 58 is in fluid communication with rod-side chamber 64 and cap-side hydraulic port 60 is in fluid communication with cap-side chamber 66. A passageway in the form of a dampening orifice 68 is defined in the piston 62 and facilitates flow of hydraulic fluid between the rod-side chamber 64 and the cap-side chamber 66. As will be described hereafter, the dampening orifice 68 is used in conjunction with a check valve 186 in the piston cylinder 42 to further control the flow of hydraulic fluid between the chambers 64, 66, such as, for example, one way flow only from the rod-side chamber 64 to the cap-side chamber 66.

In use, the hydraulic circuit 32 conveys hydraulic fluid to and from the piston-cylinders 42 and controls the pressure of the hydraulic fluid to move the brake 30 between its closed position and its open position and to apply selected braking pressures to the wheel of the railcar. Specifically, the hydraulic piston-cylinder 42 is movable under hydraulic pressure from the circuit 32 between an extended position, wherein the piston-rod 46 extends from the cylinder 44 to move the brake 30 into the closed position and a retracted position wherein the piston-rod 46 retracts into the cylinder 44 to move the brake 30 into the open position. When it is desired to retard the motion of a railcar riding on rails 24 a Braking State is initiated, hydraulic fluid is provided to one end of the piston-cylinder 42 via the hydraulic circuit 32 to actuate the piston-cylinder 42 to extend piston-rod 46. The piston-cylinder 42 pivots the ends of levers 38, 40 apart, and thus moves the brake shoes 50 towards each other and into contact with a railcar wheel. Brake shoes 50 contact the inside and outside of a railcar wheel riding on the rail to apply a braking pressure. To decrease braking force during the Braking State, the fluid pressure on the end of the piston-cylinder 42 is decreased. To terminate the retarding action the fluid pressure on the end of the piston-cylinder 42 is removed and the return springs 55, 57 and the weight of the upper lever 38 move the ends of levers 38, 40 together and thus move the brake shoes 50 outwardly away from the railcar wheel and into a Relaxed State. The brake shoes 50 can also be moved outwardly away from the railcar wheel and into a Power Open/Flush State by providing hydraulic fluid to an opposite end of the piston-cylinder 42 to actuate the piston-cylinder 42 to retract piston-rod 46.

Figure 7:
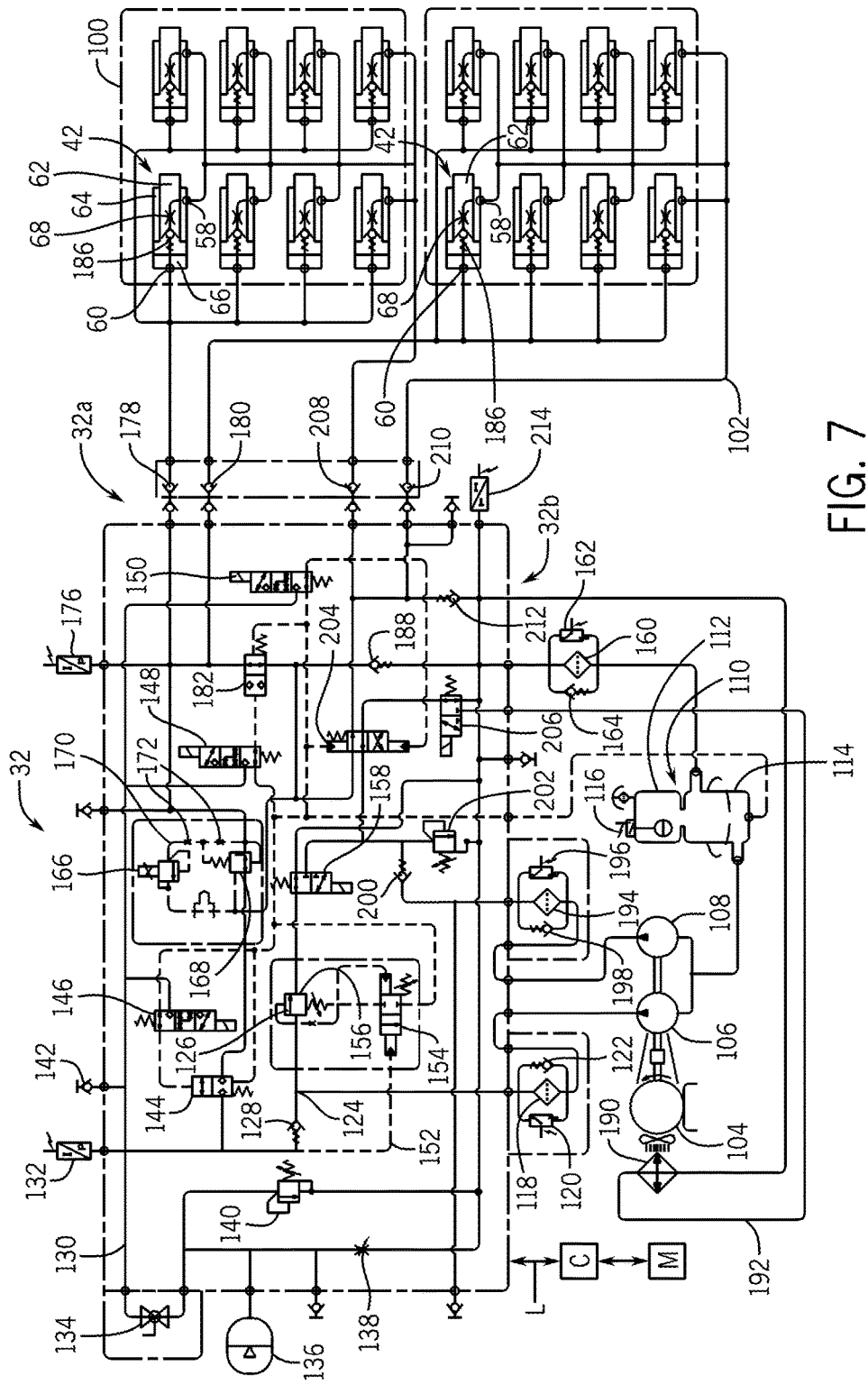
FIG. 7 is a schematic view of an electro-hydraulic system for operating the retarder system.

A non-limiting example of the hydraulic circuit 32 and related components will now be described with reference to drawing FIG. 7. The hydraulic circuit 32 is configured with a first section or manifold 32a and a second section or manifold 32b. FIG. 7 depicts the hydraulic circuit 32 including a first cylinder bank 100 and a second cylinder bank 102. In the example shown, each of the banks 100, 102 includes a series of eight piston-cylinders 42 which are interconnected together in series to selectably control opening and closing of brakes 30 associated with the piston-cylinders 42. It should be recognized that other cylinder bank configurations are contemplated by this disclosure.

The retarder system 20 also includes a control circuit C which can be located adjacent to and/or remotely from the retarder system 20. The control circuit C can include one or more control circuit sections. Each section is generally a computing system that includes a processing system, storage system, software, communication interface, and optionally a user interface. The processing system loads and executes software from the storage system, including a software module. When executed by the computing system, software module directs the processing system to operate as described herein in further detail in accordance with the methods of the present disclosure. While a description as provided herein refers to a computing system and a processing system, it is to be recognized that implementation of such systems can be performed using one or more processors, which may be communicatively connected, and such implementations are considered to be within the scope of the disclosure. The processing system can include a microprocessor and other circuitry that retrieves and executes software from a storage system. Processing systems can be implemented with a single processing device but can also be distributed across multiple processing devices or subsystems that cooperate in executing program instructions. Examples of processing systems includes a general purpose central processing unit, application specific processor, logic devices, as well as other types of processing devices, combinations of processing devices, or variations thereof. Storage systems can include any storage media readable by a processing system and capable of storing software. The storage system can include volatile and non-volatile, removable and non-removable media implemented in any method or technology for storage of information, such as computer readable instructions, data structures, program modules, or other data. Storage systems can be implemented as a single storage device, but may also be implemented across multiple storage devices or subsystems. Storage systems can further include additional elements, such as a controller, capable of communicating with the processing system. Each storage media can include random access memory, read only memory, magnetic disks, optical disks, flash memory disks, virtual and non-virtual memory, magnetic sets, magnetic tape, magnetic disk storage or other magnetic storage devices, or any other media which can be used to store the desired information and that may be accessed by an instruction execution system, as well as any combination or variation thereof, or any other type of storage media. In some implementations, the storage media can be a non-transitory storage media. User interface can include a mouse, a keyboard, a voice input device, a touch input device for receiving a gesture from a user, a motion input device for detecting non-touch gestures and other motions by a user, and other comparable input devices and associated processing elements capable of receiving user input from a user. Output devices such as a video display or a graphical display can display an interface further associated with embodiments of the system and method as disclosed herein.

The control circuit C is configured to send and receive commands or signals with a location yard monitor system M, such as by means of a detector, radar, laser and the like, to determine the position of a moving railcar in the retarder system 20. As a railcar approaches the retarder system 20, the yard monitor system M monitors environmental factors and/or characteristics of the railcar such as weight, velocity, direction and the like, and calculates an amount of braking pressure necessary to achieve a desired railcar speed, all as is conventional. Based upon the calculation, the control circuit C is programmed, such as by a programmable logic controller (PLC), to control operations of the various components of the retarder system 20 via one or more wired or wireless links as shown schematically at L to achieve a selected braking pressure. Braking pressure is typically defined in the art in terms of various railcar weight classes.

The control circuit C is designed to control one or more components of the retarder system 20 to apply, maintain or change a predetermined braking pressure on the railcar wheel(s) as it travels and leaves the system 20 (as determined by the yard monitoring system M). Prior to the wheel(s) entering the system 20, the control circuit C can control the retarder system 20 to open and/or close the brakes 30 with minimal pressure. Once the railcar is in the system 20, the control circuit C can quickly change braking pressures applied to the wheel(s) in accordance with the predetermined or active parameters set by the yard monitoring system M and/or entered by an operator into the system 20 via a conventional computer input device (not shown). Each of these functions is accomplished by the programming of the control circuit C and its communication with components in the system 20 which will be understood by one having ordinary skill in the art.

Figure 8:
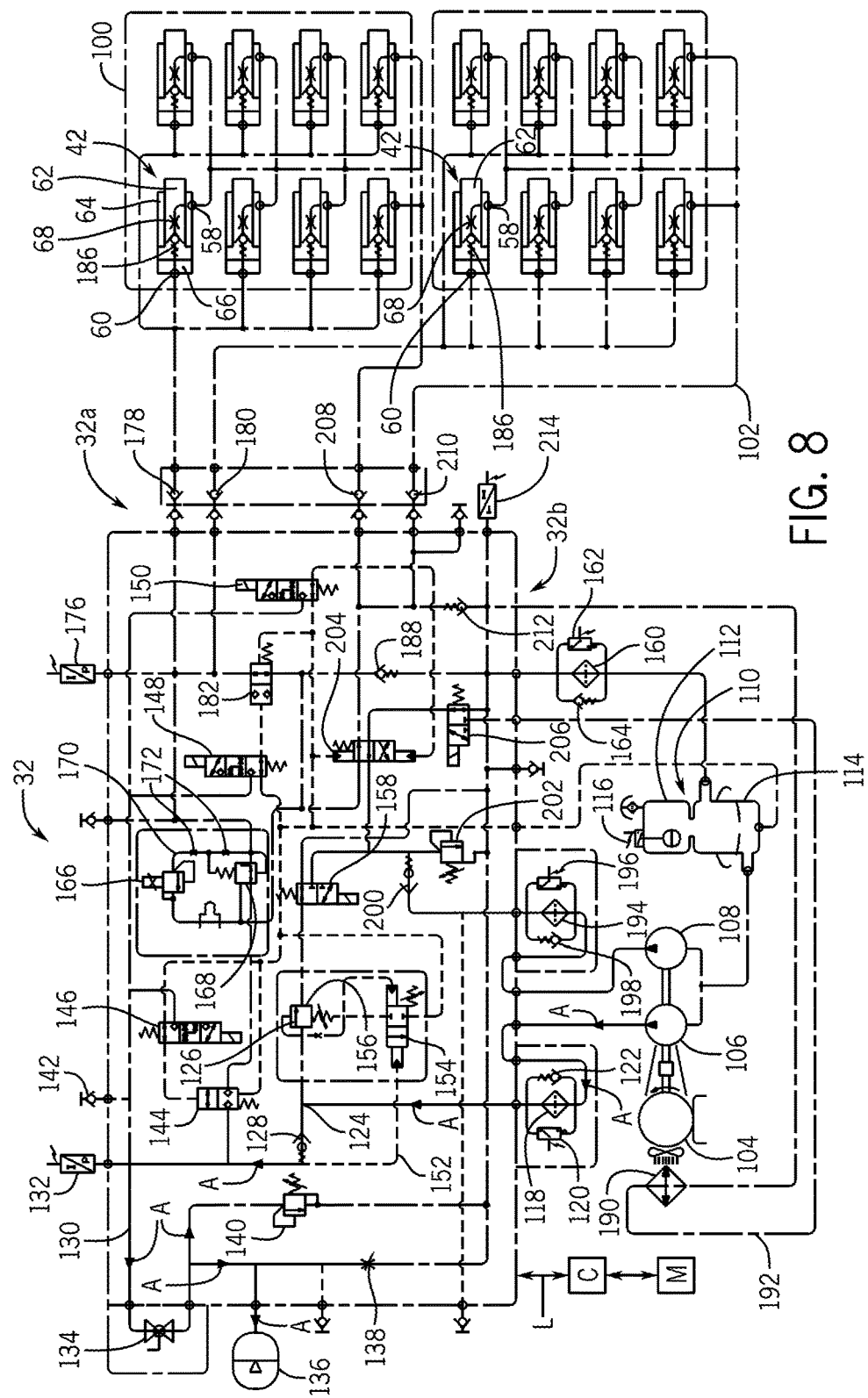
FIG. 8 is a schematic view of the system of FIG. 7 showing charging of an accumulator.

With further reference to FIGS. 7 and 8, the hydraulic circuit 32 includes an electric motor 104 for powering a primary gear pump 106 and a secondary gear pump 108 which are interconnected so as to be operated together, and are controlled for selective activation and deactivation by the control circuit C. The pumps 106, 108 are configured to variously pump hydraulic fluid into the first manifold 32a and the second manifold 32b. The pumps 106, 108 are in communication with a supply of hydraulic fluid contained in a cyclonic reservoir 110 having an upper portion 112 and a lower portion 114 such as is commercially available from Eaton Corporation Hydraulics Operation of Eden Prairie, Minn. Such cyclonic reservoir 110 is more fully disclosed in U.S. Pat. No. 5,918,760, European Patent No. 0831238, Swedish Patent No. 510620 and German Patent No. 69705474.8, each of which is incorporated herein in entirety by reference. The upper portion 112 is provided with a switch 116 for sensing and responding to a lower than desired hydraulic fluid level in the reservoir 110. When the motor 104 is energized, the primary pump 106 pumps hydraulic fluid, such as oil, from the reservoir 110 into the hydraulic circuit 32 and, more specifically, to a high pressure filter unit defined further by a high pressure filter 118, a clogging switch 120 and a check valve 122 as shown by the arrows A in FIG. 8. Hydraulic fluid normally flows through the filter 118 which acts to protect contaminants from entering components in the hydraulic circuit 32, and is directed towards a junction 124. In the event the filter 118 becomes clogged or obstructed with contaminants carried by the hydraulic fluid, the clogging switch 120 will react to an increase in hydraulic fluid pressure differential and will transmit a signal to the PLC unit associated with the control circuit C that the filter 118 needs to be changed. At the same time, when the hydraulic fluid pressure exceeds a predetermined level (e.g. 50 psi) due to the clogging of the filter 118, the check valve 122 opens. This allows the hydraulic fluid to bypass the filter 118 and continue into the hydraulic circuit 32 to the junction 124 which is connected on one side to a pump unloader valve 126 and is connected on an opposite side to a check valve 128. Hydraulic fluid cannot flow past the unloader valve 126 because it is closed, and travels instead through the check valve 128 to a header 130 which is connected to a pressure transducer 132 that is monitoring system pressure and controlling the motor 104. The hydraulic fluid is then directed through a ball valve 134 to an accumulator 136, a manual flow control valve 138 and a relief valve 140, as required by OSHA for a manual bleed-off and safety release of the accumulator's stored energy. As will be explained below, the pump 106 is periodically energized to charge the accumulator 136 so that the accumulator 136 by itself provides pressurized hydraulic fluid which is used to provide powered movement of the brake 30 to the closed position and the Braking State. Periodically operating the pump 106 provides a savings cost to the railyard owner in contrast with prior art systems with constantly running pumps which have been found to consume excessive electrical power.

The accumulator 136 can include any one of a variety of hydraulic energy storage devices, such as compressed gas or a gas-charged accumulator or the like. In the example shown, the accumulator 136 is constructed with two chambers that are separated, for example, by an elastic diaphragm or floating piston. One chamber contains an inert gas under pressure or "pre-charge" that provides compressive force on the hydraulic fluid in the hydraulic circuit 32. Here, the hydraulic circuit 32 is designed so that the primary pump 106 pumps hydraulic fluid to the other chamber of the accumulator 136 for a predetermined time to charge or load the accumulator 136 above its preloaded nitrogen charge (e.g. 2200 psi) until the hydraulic fluid reaches a predetermined maximum system pressure such as, for example, 3000 psi. In this charging phase, hydraulic fluid is prevented from flowing past the manual flow control valve 138 which is normally closed. The manual flow control valve 138 can be opened to ensure that hydraulic fluid in the accumulator 136 is directed back to the reservoir 110 at a regulated rate when the retarder system 20 is shut down. The relief valve 140 is normally closed to prevent any fluid flow therethrough. However, if the pressure of the hydraulic fluid charged in the accumulator 136 exceeds the predetermined maximum system pressure by a certain amount, for example if the charge pressure reaches 3250 psi, the relief valve 140 is shifted open to discharge an appropriate amount of fluid back to the reservoir 110 until the maximum system pressure is satisfied at which time the relief valve 140 is again closed.

Figure 9:
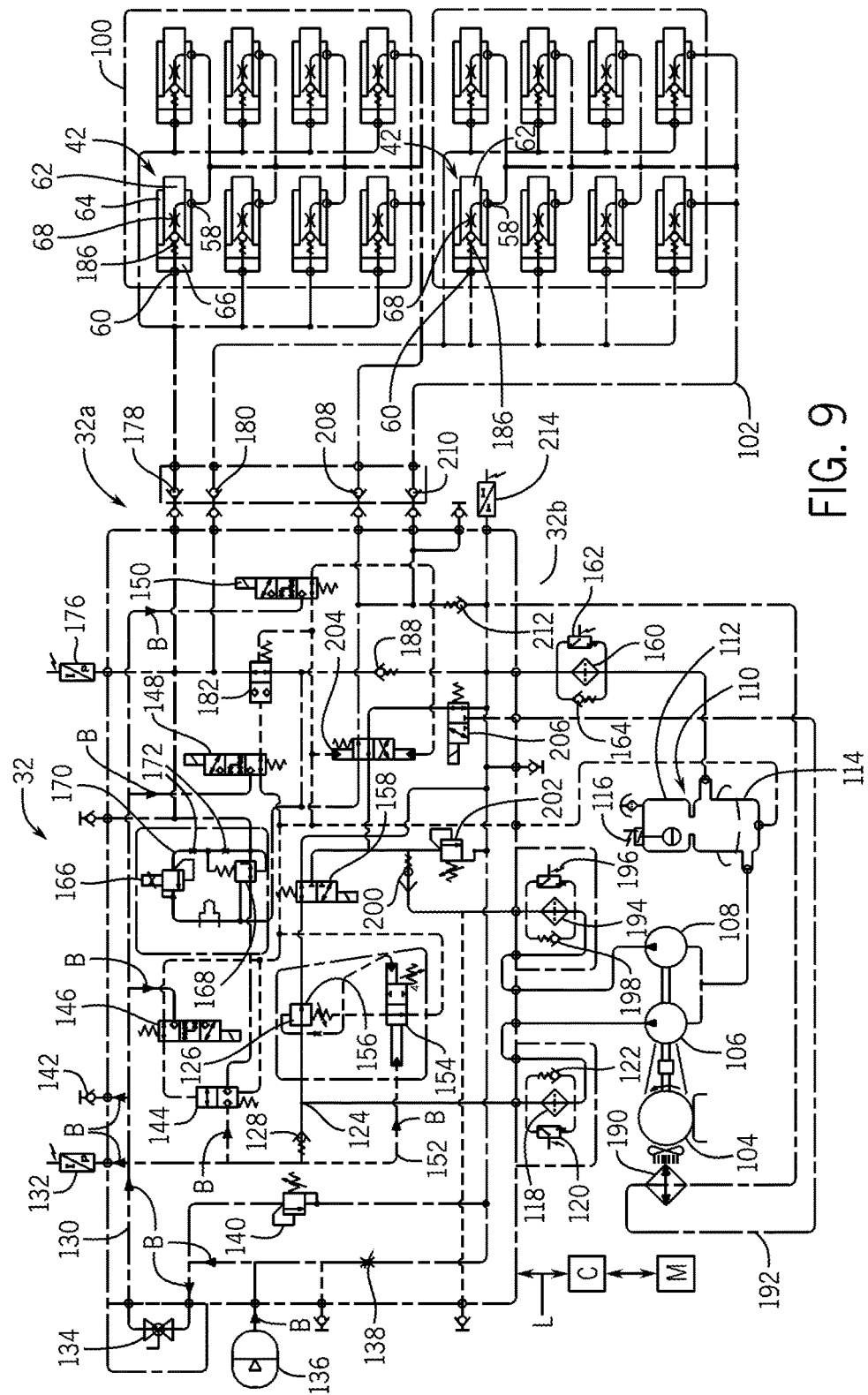
FIG. 9 is a schematic view of the system of FIG. 7 showing the accumulator being fully charged.

As the primary pump 106 charges the accumulator 136 with hydraulic fluid, the system pressure, represented by arrows B in FIG. 9, begins to build up in the hydraulic circuit 32. This increasing system pressure is transmitted through the ball valve 134 and the header 130, the pressure transducer 132 and to a pressure tap 142 to allow for manual system monitoring. System pressure is also transmitted to an accumulator isolator 144 and a pilot controlled solenoid valve 146 for the operation of the isolator 144. Both the isolator 144 and the solenoid valve 146 are used when it is desired to close the brakes 30 in the retarder system 20, during the Braking State. Both the isolator 144 and the solenoid valve 146 are normally closed so that there is no fluid flow therethrough. System pressure is further transmitted to a pilot directional control solenoid valve 148 and a pilot controlled solenoid valve 150, both of which are initially closed so that there is no fluid flow therethrough. In addition, system pressure is communicated via path 152 so that it will push on a plunger of an unloader 154. This opens up a circuit which allows the system pressure to be transmitted to the unloader valve 126 where the high system pressure which has been built up shifts the spool of the unloader valve 126 enabling all the hydraulic fluid to be unloaded such as represented at 156. Hydraulic fluid exiting the unloader valve 126 is in communication with a flow diverter solenoid valve 158, which is further in communication with a filter 160 of a return filter unit to the reservoir 110. The return filter unit includes a clogging switch 162 and a check valve 164 which operates similarly to clogging switch 120 and check valve 122.

Figure 10:
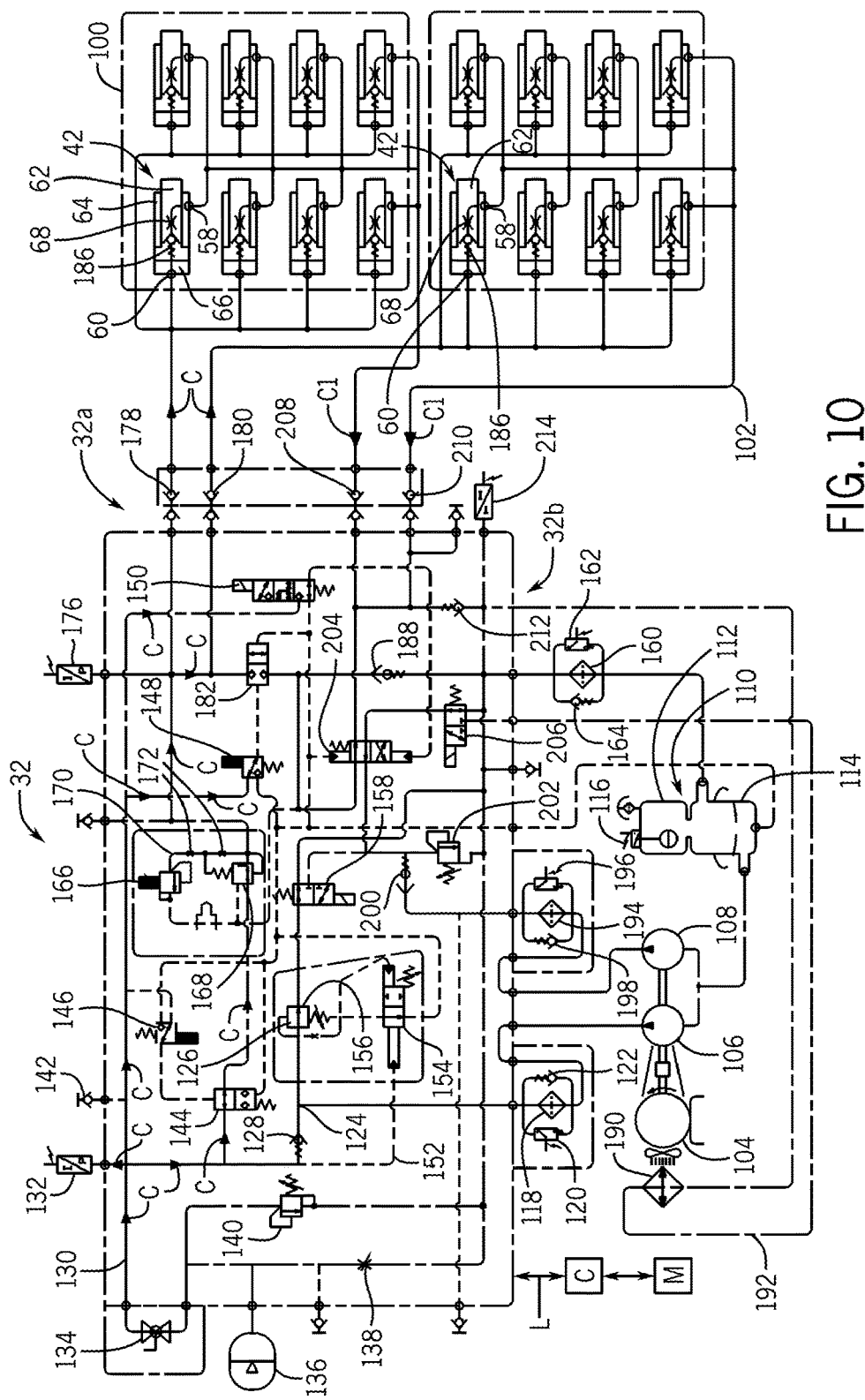
FIG. 10 is a schematic view of the system of FIG. 7 showing a powered closing of the brake and a discharging of the accumulator into a Braking State.

At this point, the accumulator 136 is fully charged, the motor 104 is turned off, the piston-cylinders 42 associated with the brakes 30 are in a retracted mode and the hydraulic circuit 32 is readied for a braking event in which each piston 62 may be extended as the accumulator 136 is discharged. To close the brakes 30, the control circuit C sends a signal to energize and shift the pilot control solenoid valve 146 from the closed condition to an open condition. As depicted in FIG. 10, hydraulic fluid, as represented by arrows C, then flows through the solenoid valve 146 which acts as a pilot valve to a port of the accumulator isolator 144. Here, the pressure of the hydraulic fluid acts on a spring biased spool of the accumulator isolator 144 to effect opening thereof so that full pressure hydraulic fluid exits from the accumulator isolator 144 and flows towards a pressure controlling arrangement where a particular hydraulic fluid operating pressure is selected. The pressure controlling arrangement is located in the first manifold 32a and includes a pilot controlled proportional solenoid valve 166, and a main stage logic element 168 connected to the solenoid valve 166 by a pilot line 170 provided with a pair of orifices 172. The control circuit C sends an electrical signal to energize the pilot control solenoid valve 166 corresponding to a selected desired braking pressure. That is, the control circuit C is configured to send a plurality of different electrical signals to the pilot control solenoid valve 166, each signal causing the valve 166 to control the logic element 168 to achieve a different one of a plurality of different fluid pressures in the first manifold 32a corresponding to a different one of a plurality of different braking pressures. The pilot controlled solenoid valve 166 controls the logic element 168 by controlling the pressure of fluid in the pilot line 170 coupled to the logic element 168. Pressure of fluid in the pilot line 170 is maintained proportional to the plurality of the different signals. Pressure of fluid in the first manifold 32a which is controlled by the logic element 168 is maintained proportional to the pressure of fluid in the pilot line 170. This arrangement is designed to provide fine pressure control of the hydraulic fluid in the hydraulic circuit, and provide a more efficient quick response to commands from the control circuit C.

Hydraulic fluid at the selected pressure is then monitored by a pressure transducer 176 and delivered through multi-port connectors 178, 180 into the cap-side chamber 66 of each piston-cylinder 42. Hydraulic fluid flowing towards a directional control valve 182 is prevented from flow therethrough by sending a signal to energize solenoid valve 148 causing the directional control valve 182 to close and prevent flow to the reservoir 110. Introduction of hydraulic fluid represented by arrows C into the cap-side chamber 66 forces each piston 62 into an extended position thus forcing the upper and lower levers 38, 40 to pivot about the pin 36 and close the brake shoes 50 relative to one another. Thus, the brake 30 is actuated via a powered movement into a closed condition and the Braking State with a selected braking pressure commensurate to that set by the control circuit C. During brake closing, the solenoid valves 150 and 158 are de-energized, while solenoid valves 146, 148 and 166 are energized as noted above.

During movement of each piston 62 into its extended position, the hydraulic fluid will act to close a check valve 186 provided on the piston 62 so that there is no fluid transfer through dampening orifices 68 between the rod-side chamber 64 and the cap-side chamber 66. Hydraulic fluid flows out of the rod-side port 58 and, as represented by arrows C1, is discharged back into the hydraulic circuit 32 thus facilitating movement of the brake 30 to the closed position.

Figure 11:
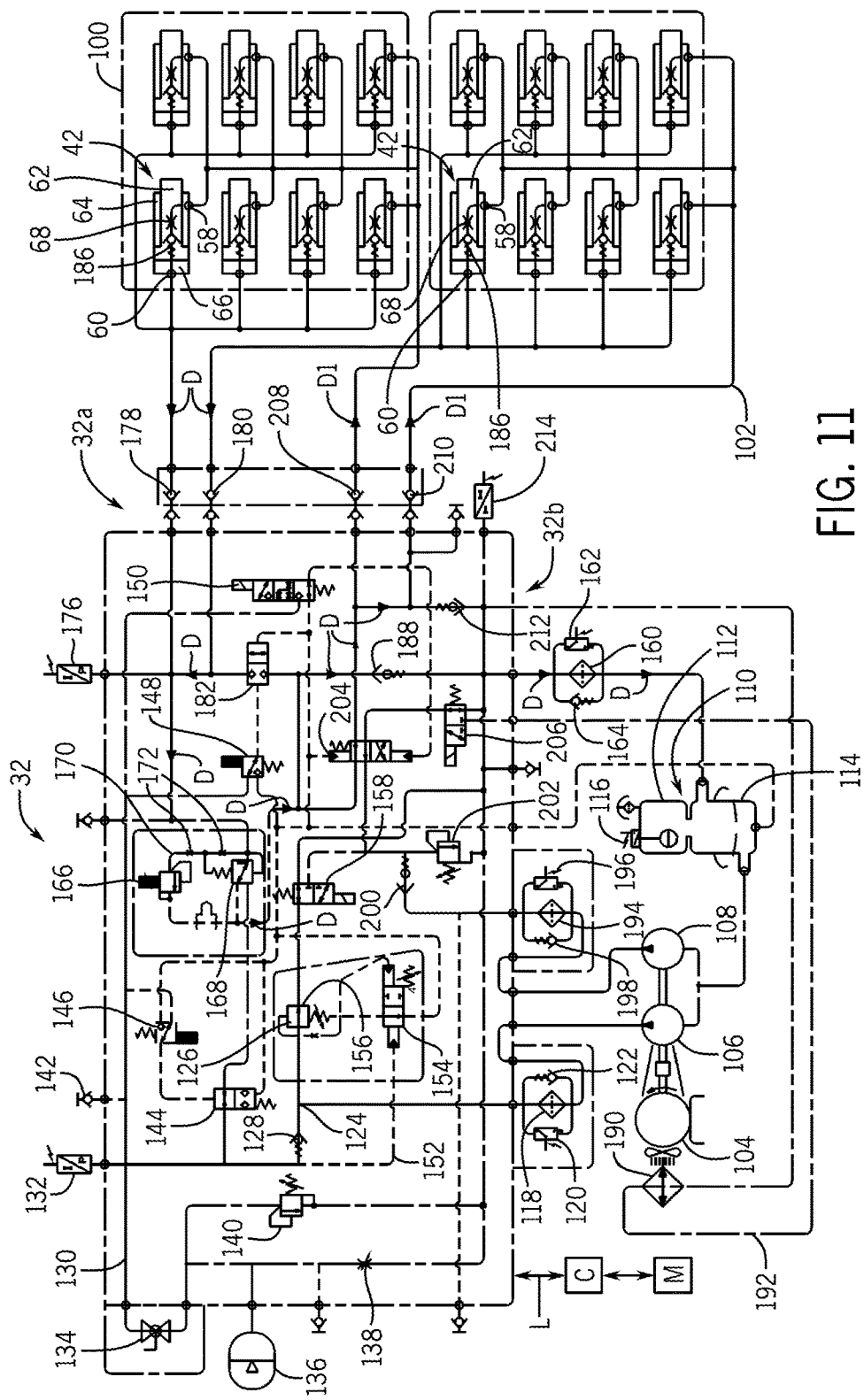
FIG. 11 is a schematic view of the system of FIG. 7 when the brake is closed and a railcar wheel enters the brake.

When the brake 30 is in the closed position and with solenoid valves 146, 148 and 166 energized, it is forced into an open position by a railcar wheel traveling into the brake 30 as illustrated in FIG. 11. As hydraulic fluid represented by arrows D is forced from the cap-side port 60 of each piston-cylinder 42, there is a rapid movement of piston rod 62 and an increase or spike in the hydraulic fluid pressure. Such pressure increase is transmitted to the logic element 168 in the first manifold 32a which shifts to allow excess hydraulic fluid to be directed to the reservoir 110 so that over-pressurization is avoided and the selected system pressure is maintained. The excess hydraulic fluid flowing to the reservoir 110 passes through a back-pressure inducing check valve 188 so that a portion of the hydraulic fluid is transferred through multi-port connectors 208, 210, as represented by arrows D1, to the rod port 58 of each piston-cylinder 42 to prevent cavitation during rapid movement of each piston rod 62.

Figure 12:
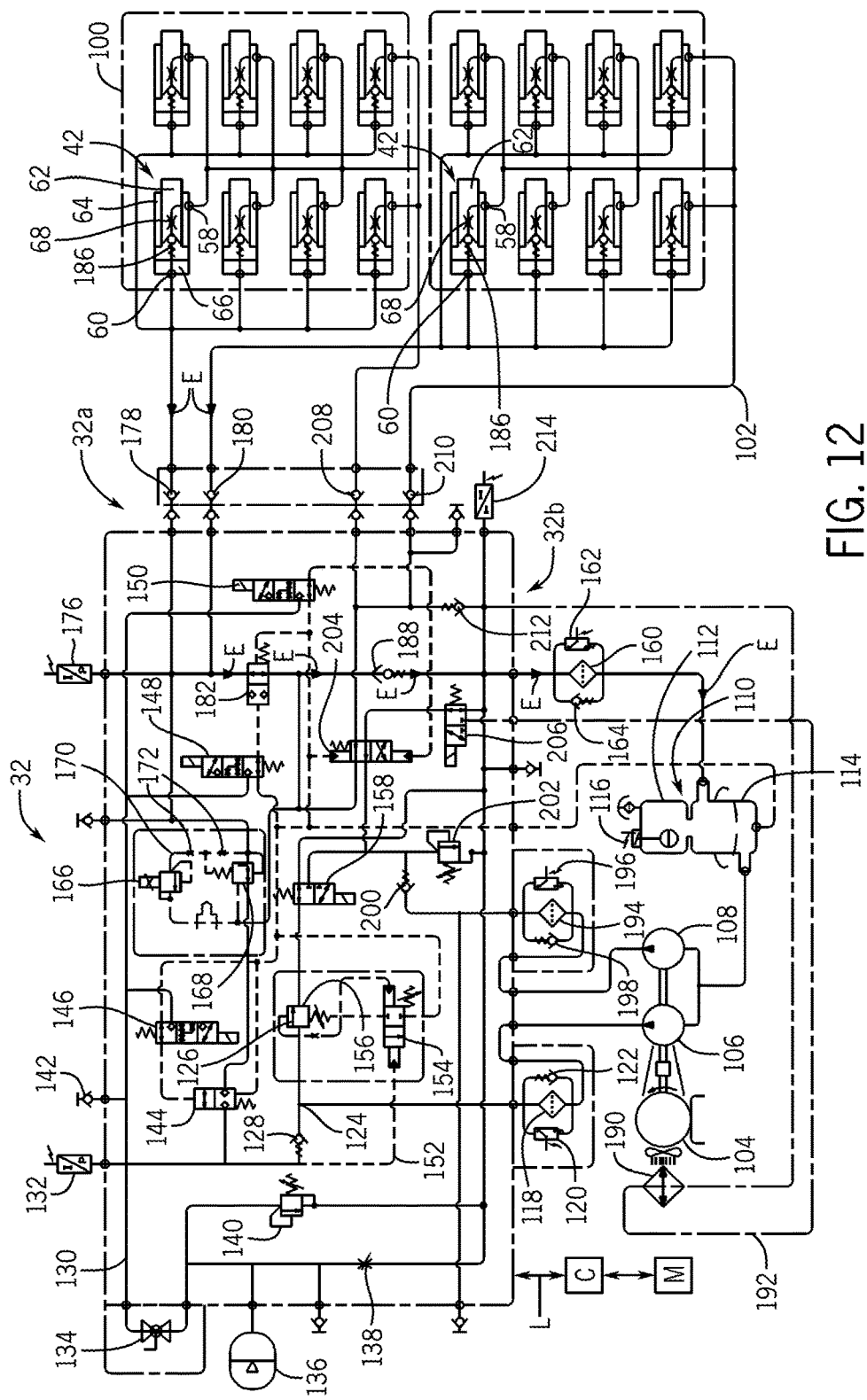
FIG. 12 is a schematic view of the system of FIG. 7 showing a non-powered opening of the brake into a Relaxed State.

Referring to FIG. 12, when it is desired to move from the Braking State to the Relaxed State, the solenoid valves 146, 148 are de-energized and shifted closed by the control circuit C. Solenoid valves 150, 158 and 166 are likewise de-energized by the control circuit C. In addition, the directional control valve 182 will assume a normally open position and allow hydraulic fluid as represented by arrows E to be sent therethrough past check valve 188 and to a low pressure filter unit including return filter 160, a clogging switch 162 and a bypass-check valve 164 for delivery to the reservoir 110.

It should be appreciated that at this point, no pressurized hydraulic fluid has been supplied to the rod ports 58 of the piston-cylinders 42. Instead, the hydraulic fluid is given a free path from the cap-side chambers 66 back to reservoir 110 defining a relaxed position for the piston-cylinder 42 in which the weight of the levers 38, 40 and the return springs 55, 57 will cause at least partial opening of the brakes 30 via a non-powered movement. This feature provides for faster brake opening reaction times and makes the retarder system 20 more energy efficient.

Figure 13:
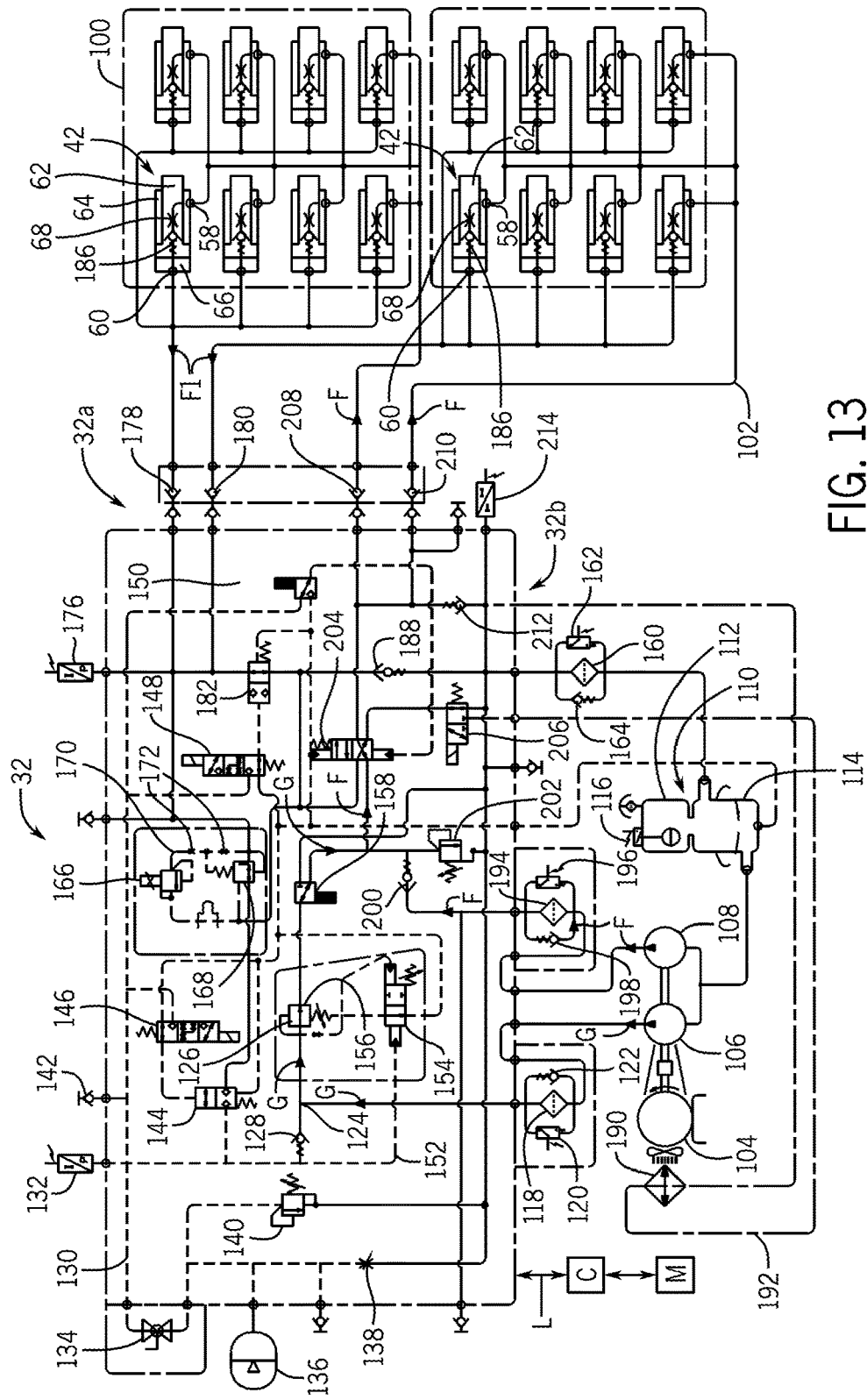
FIG. 13 is a schematic view of the system of FIG. 7 showing a powered opening of the brake into a Power Open/Flush State.

Referring to FIG. 13, when it is desired to provide a powered opening of the brakes 30, the secondary pump 108 pumps hydraulic fluid as represented by arrows F from the reservoir 110 through a filter 194 of a high pressure filter unit defined further by a clogging switch 196 and a check valve 198 that operates similarly to clogging switch 120 and check valve 122. Hydraulic fluid is pumped by the secondary pump 108 past a check valve 200 which is in communication with a relief valve 202 similar to relief valve 140. That is, the relief valve 202 acts to allow hydraulic fluid flow back to the filter 194 when the pressure exceeds a predetermined maximum value (e.g. 600 psi). The hydraulic fluid leaving the check valve 200 flows to a pilot controlled directional control valve 204 for assisting in a power open and flush and retraction of the piston-cylinders 42. The directional control valve 204 is in communication with a flow diverter solenoid valve 206 selectively used to divert flow of heated hydraulic fluid to a cooler 190 in a cooling loop 192. The solenoid valves 146, 148 and 158 are de-energized and solenoid valve 150 is energized to shift the spool of the pilot controlled directional control valve 204 so that hydraulic fluid pumped by the secondary pump 108 flows through multi-point connectors 208, 210, as represented by arrows F, and to the rod-side chambers 64 to power retract and flush the piston-cylinders 42. As hydraulic fluid enters the rod-side chambers 64, the hydraulic fluid passes through the dampening orifices 68 and pushes open the check valves 186 so that some hydraulic fluid flushes to the cap-side chambers 66. This flushing arrangement enables the hydraulic fluid fed into the cap-side chambers 66 to be slowly recycled into the hydraulic circuit 32 and through the filters 118, 160, 194 so that the hydraulic fluid can be better cleaned. Thus, the piston-cylinders 42 assume retracted positions and the brakes 30 are actuated via a powered movement into the open position and a Power Open/Flush State using either the secondary pump 108 or both pumps 106, 108 as described below. Hydraulic fluid flows out of the cap-side chambers 66, as represented by arrows F1, and is discharged back to the hydraulic circuit 32.

As a feature of the disclosure, it may be possible to combine hydraulic fluid flows of the primary pump 106 and the secondary pump 108 to move the brakes 30 to their powered open position with decreased cycle times and faster speeds, if the accumulator 136 is at full hydraulic charge pressure. When primary pump 106 is available, both the solenoid valve 150 and the flow diverter solenoid valve 158 are energized which results in the shifting of their spools and the combining of the hydraulic fluid flows from the primary pump 106 as represented by arrows G and the secondary pump 108 as represented by arrows F. This combined pump flow is again delivered through the multi-port connectors 208, 210 into the rod-side chambers 64 of the piston-cylinders 42 to effect a faster, more efficient powered movement and opening of the brakes 30.

Figure 14:
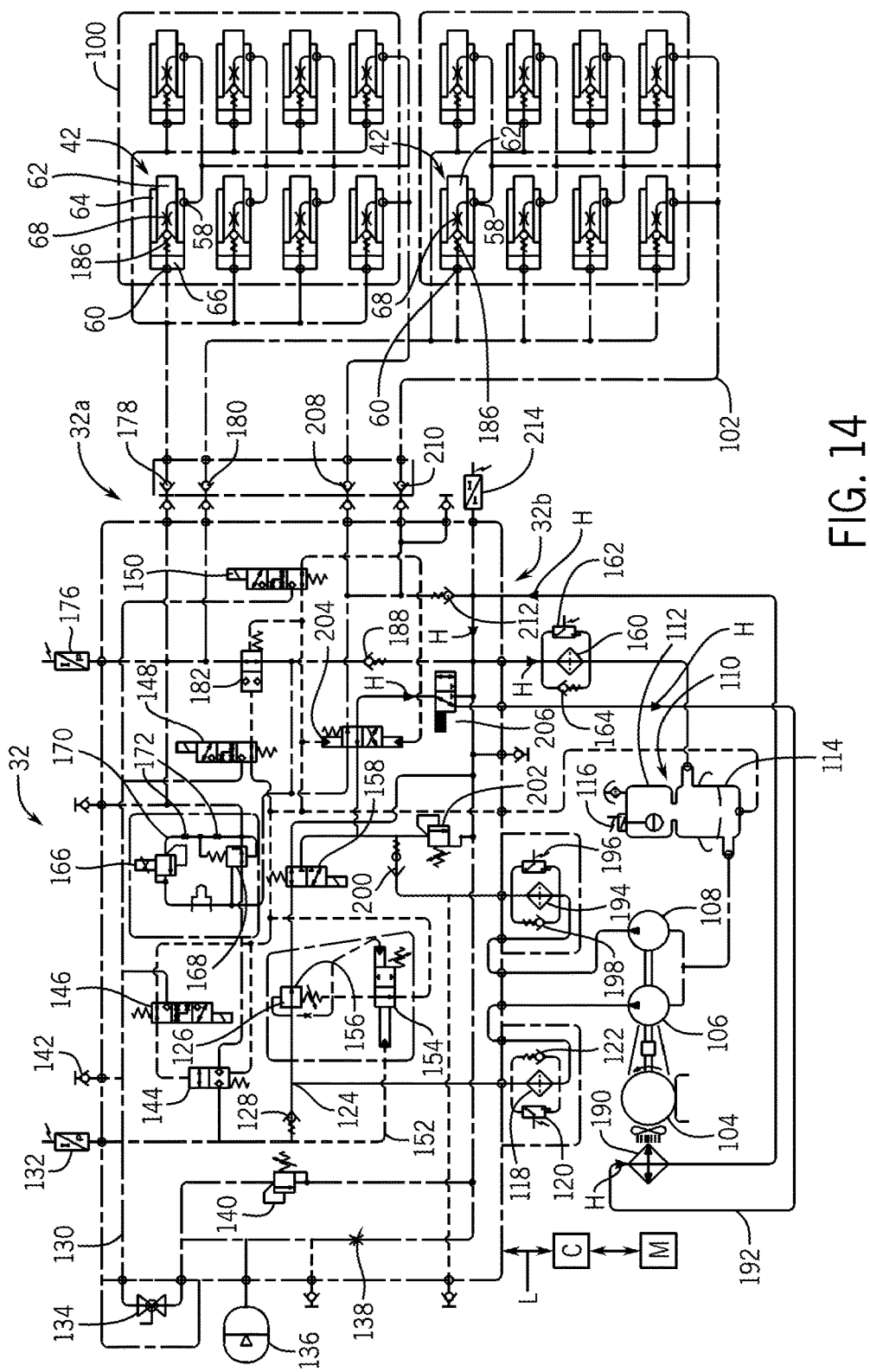
FIG. 14 is a schematic view of the system of FIG. 7 showing a cooling loop.

Referring to FIG. 14, should the hydraulic fluid become heated during operation, the solenoid valve 206 is energized to shift its spool so that the heated hydraulic fluid, as represented by arrows H, passing through directional control valve 204 will flow to the cooler 190. Cooled fluid from cooler 190 is then returned back into the cyclonic reservoir 110.

A further feature of the disclosure resides in the provision of certain components 144, 146, 148, 150, 154 (pilot port three), 182 which are designed to provide ultra low fluid leakage for maintaining accumulator charge. An anti-cavitation check valve 212 connects the low pressure return fluid directly to the rod-side 64 of each piston-cylinder 42. In the event the piston-cylinders 42 are forced open while the motor 104 is off, the check valve 212 allows oil to freely flow from the low pressure return to the rod-side 64 of each piston-cylinder 42 to prevent cylinder cavitation. All return hydraulic fluid is monitored by a temperature sensor 214.

The reservoir 110 is a cyclonic reservoir defined generally by a circular tank that holds the returned hydraulic fluid. The fluid spins and centrifugal forces push the entrained air to the center of the reservoir and the air bubbles will rise past an integrated baffle and naturally aspirate in the upper portion 112 of the reservoir 110. The cyclonic reservoir 110 provides for a more efficient reservoir used in the processing of the returned hydraulic fluid in the hydraulic circuit 32.

Figure 15:
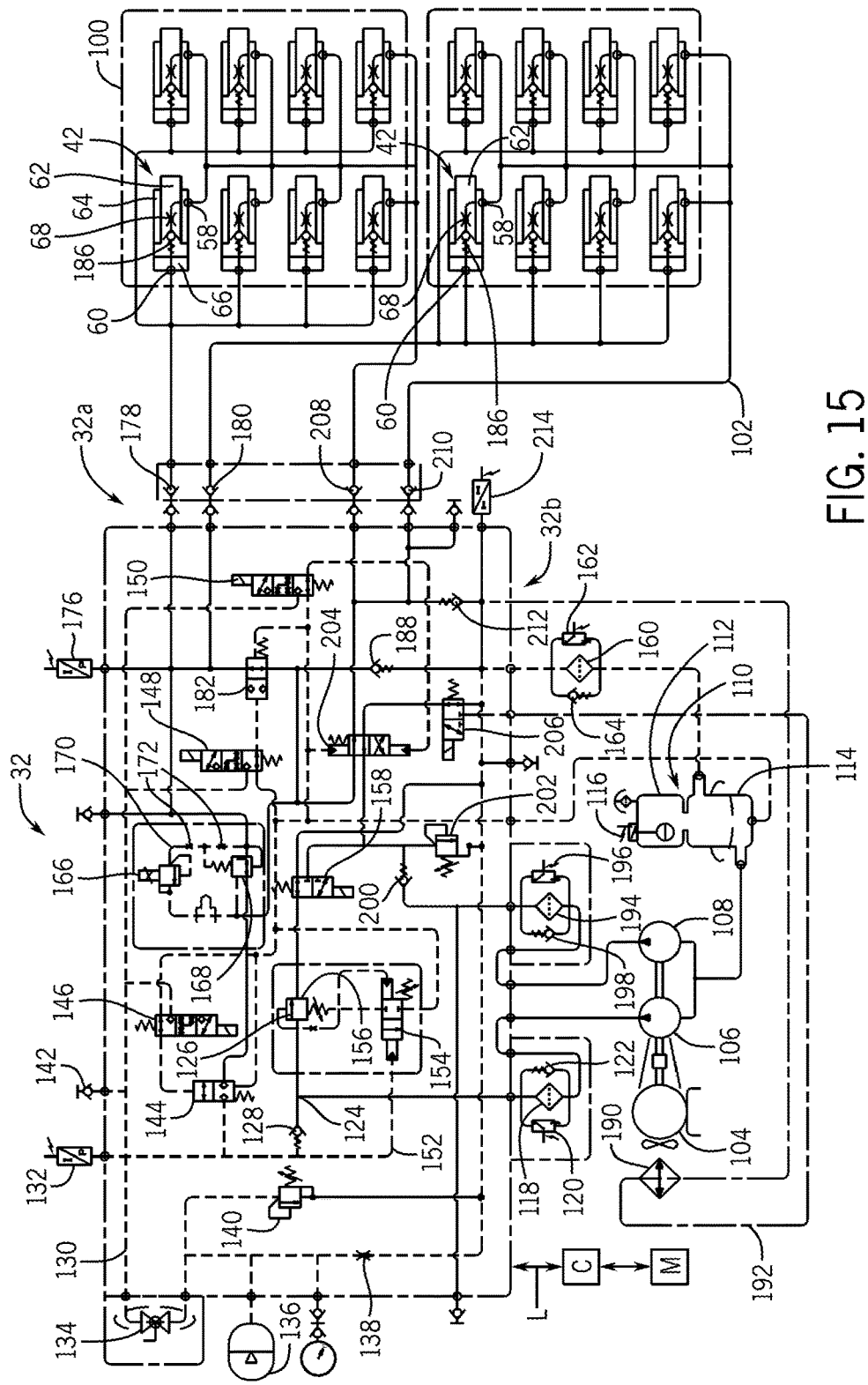
FIG. 15 is a schematic view of the system of FIG. 7 showing an accumulator repair/replacement.

Referring to FIG. 15, should it be necessary to repair or replace the accumulator 136, the motor 104 is turned off and the system must first be drained by manually opening the flow control valve 138 and then manually closing the ball valve 134. Following accumulator repair/replacement, the flow control valve 138 is manually closed and the ball valve 134 is manually opened.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A system for retarding the speed of a railcar, the railcar comprising:
   a brake;
   a hydraulic actuator moving the brake between a closed position in which the brake applies braking pressure on a wheel of a railcar, and an open position in which the brake does not apply braking pressure on the wheel of the railcar;
   a hydraulic circuit configured with a first manifold and a second manifold, and provided with a pump arrangement for supplying hydraulic fluid from a reservoir to the hydraulic actuator; and
   a control circuit coupled to the hydraulic circuit for controlling the flow of hydraulic fluid to move the brake between the closed position and the open position,
   the pump arrangement being configured to supply the hydraulic fluid to one end of the hydraulic actuator and providing powered movement of the brake to the closed position and to an opposite end of the hydraulic actuator and providing powered movement of the brake to the open position;
   a hydraulic accumulator connected to the pump arrangement, wherein the pump arrangement is only periodically energized and charges the hydraulic accumulator, and wherein the hydraulic accumulator is configured to provide powered movement of the brake to the closed position when the pump arrangement is de-energized;
   wherein the control circuit and the hydraulic circuit are configured to provide a non-powered movement of the brake from the closed position to the open position without hydraulic fluid being forced from the hydraulic actuator and without hydraulic fluid being supplied to the hydraulic actuator such that the hydraulic fluid from the one end of the hydraulic actuator is given a free path therefrom back to the reservoir defining a relaxed position for the hydraulic actuator.

2. The system of claim 1, wherein the closed position defines a Braking State, and the open position defines one of a Relaxed State and a Power Open/Flush State.

3. The system of claim 2, wherein the pump arrangement is driven by a motor.

4. The system of claim 3, wherein the pump arrangement comprises a first pump used to provide powered movement of the brake to the Power Open/Flush State.

5. The system of claim 3, wherein the pump arrangement comprises first and second pumps used to provide powered movement of the brake to the Power Open/Flush State.

6. The system of claim 2, wherein the hydraulic actuator comprises a piston movably disposed in a cylinder, wherein pressurized hydraulic fluid enables the piston to extend from the cylinder into an extended position to move the brake into the Braking State, and wherein pressurized hydraulic fluid enables the piston to retract into the cylinder in a retracted position to move the brake into the Power Open/Flush State.

7. The system of claim 6, wherein the piston defines an orifice therethrough in communication with a check valve and wherein the orifice and the check valve facilitate flushing of hydraulic fluid from a rod-side of the cylinder to a cap-side of the cylinder when the piston is moved from the extended position to the retracted position in the Power Open/Flush State.

8. The system of claim 6, wherein the control circuit and the hydraulic circuit are operated to provide non-powered movement to the Relaxed State without supplying pressurized hydraulic fluid to the cylinder.

9. The system of claim 2, wherein the brake includes a set of levers and return springs, and wherein, in the Relaxed State, the hydraulic fluid flows freely from a cap-side chamber of the hydraulic actuator to the reservoir such that weight of the levers and return force of the springs causes at least partial opening of the brake.

10. A system for retarding the speed of a railcar, the railcar comprising:
a brake;
a hydraulic actuator moving the brake between a closed position in which the brake applies braking pressure on a wheel of a railcar, and an open position in which the brake does not apply braking pressure on the wheel of the railcar;
a hydraulic circuit configured with a first manifold and a second manifold, and provided with a pump arrangement for supplying hydraulic fluid from a reservoir to the hydraulic actuator;
a control circuit coupled to the hydraulic circuit for controlling the flow of hydraulic fluid to move the brake between the closed position and the open position, the pump arrangement being configured to supply the hydraulic fluid to one end of the hydraulic actuator and providing powered movement of the brake to the closed position and to an opposite end of the hydraulic actuator and providing powered movement of the brake to the open position; and
a hydraulic accumulator connected to the pump arrangement;
wherein the control circuit and the hydraulic circuit are configured to provide a non-powered movement of the brake from the closed position to the open position without hydraulic fluid being forced from the hydraulic actuator and without hydraulic fluid being supplied to the hydraulic actuator such that the hydraulic fluid from the one end of the hydraulic actuator is given a free path therefrom back to the reservoir defining a relaxed position for the hydraulic actuator;
wherein the closed position defines a Braking State, and the open position defines one of a Relaxed State and a Power Open/Flush State;
wherein the pump arrangement is driven by a motor;
wherein the pump arrangement is periodically energized to charge the hydraulic accumulator so that, upon de-energization of the pump arrangement, the hydraulic accumulator provides pressurized hydraulic fluid which is used to provide powered movement of the brake to the Braking State; and
wherein the hydraulic circuit comprises a cyclonic reservoir for holding a supply of hydraulic fluid, the cyclonic reservoir being in communication with the pump arrangement and configured for processing hydraulic fluid returned with entrained air in the hydraulic circuit.

11. The system of claim 10, wherein the pump arrangement is connected to a first filter, a first clogging switch and a first filter check valve.

12. The system of claim 11, wherein the pump arrangement is connected to a second filter, a second clogging switch and a second filter check valve.

13. The system of claim 11, wherein the first filter is connected to a first check valve and an unloader valve.

14. The system of claim 13, wherein hydraulic fluid flows through the first filter and the first check valve, and a ball valve for delivery to the hydraulic accumulator which is charged to a predetermined system pressure.

15. The system of claim 14, wherein the system pressure is transmitted to an accumulator isolator and a first pilot controlled solenoid valve connected to the accumulator isolator.

16. The system of claim 15, wherein the system pressure is further transmitted to a directional control solenoid valve and a second pilot controlled solenoid valve.

17. The system of claim 16, wherein system pressure is further transmitted to an unloader which enables the system pressure to operate the unloader valve such that a supply of pressurized hydraulic fluid is available at an outlet thereof.

18. The system of claim 17, wherein the unloader valve is in communication with a first flow diverter solenoid valve that is further in communication with a return filter connected to the cyclonic reservoir.

19. The system of claim 18, wherein the control circuit sends a signal to operate the first pilot controlled solenoid valve to enable flow of pressurized hydraulic fluid through the accumulator isolator to a pressure controlling arrangement which is located in the first manifold and is configured to respond to different signals sent from the control circuit to maintain a desired selected system pressure corresponding to a desired braking pressure for holding the brake in the closed position.

20. The system of claim 19, wherein the pressure controlling arrangement includes a pilot controlled proportional solenoid valve, a logic element and a pilot line connecting the pilot controlled proportional solenoid valve with the logic element.

21. The system of claim 20, wherein pressurized hydraulic fluid at the selected system pressure maintained by the pressure controlling arrangement is delivered to the hydraulic actuator to provide the powered movement of the brake to the closed position.

22. The system of claim 21, wherein during the powered movement of the brake to the closed position, the first pilot controlled solenoid valve, the directional control solenoid valve, and the pilot controlled proportional solenoid valve are energized.

23. The system of claim 22, wherein the first pilot controlled solenoid valve, the directional control solenoid valve, the second pilot controlled solenoid valve, the first flow diverter solenoid valve, and the pilot controlled proportional solenoid valve are de-energized when the brake is moved to the Relaxed State.

24. The system of claim 23, wherein the pump arrangement and the second filter are in communication with a second check valve, a pilot controlled directional control valve and a second flow diverter solenoid valve.

25. The system of claim 24, wherein the second flow diverter solenoid valve is in communication with a cooler connected to the cyclonic reservoir.

26. The system of claim 25, wherein the second pilot controlled solenoid valve is energized to control the pilot controlled directional control valve such that pressurized hydraulic fluid is delivered to the hydraulic actuator to provide a powered movement of the brake to the open position.

27. The system of claim 26, wherein, should the pressurized hydraulic fluid become heated, the second flow diverter solenoid valve is energized to divert flow from the pilot controlled directional control valve to the cooler.

28. The system of claim 27, wherein, if the hydraulic accumulator is fully charged, the second pilot controlled solenoid valve and the first flow diverter solenoid valve are energized to permit combined hydraulic fluid flow via the pump arrangement to provide the powered movement of the brake to the open position.

29. A system for retarding the speed of a railcar, the railcar comprising:
   a brake;
   a hydraulic actuator moving the brake between a closed position in which the brake applies braking pressure on a wheel of a railcar, and an open position in which the brake does not apply braking pressure on the wheel of the railcar;
   a hydraulic circuit configured with a first manifold and a second manifold, and provided with a pump arrangement for supplying hydraulic fluid from a reservoir to the hydraulic actuator; and
   a control circuit coupled to the hydraulic circuit for controlling the flow of hydraulic fluid to move the brake between the closed position and the open position, the pump arrangement being configured to supply the hydraulic fluid to one end of the hydraulic actuator and providing powered movement of the brake to the closed position and to an opposite end of the hydraulic actuator and providing powered movement of the brake to the open position;
   a pressure controlling arrangement which is located in the first manifold and is configured to respond to different signals sent from the control circuit to maintain a desired selected system pressure corresponding to a desired braking pressure for holding the brake in the closed position; and
   an anti-cavitation check valve connected to hydraulic actuator, wherein the hydraulic actuator comprises a piston movably disposed in a cylinder, and wherein the anti-cavitation check valve directs a portion of the hydraulic fluid directed to the reservoir to a rod-side of the cylinder to prevent cavitation during a rapid movement of the piston within the cylinder;
   wherein the control circuit and the hydraulic circuit are configured to provide a non-powered movement of the brake from the closed position to the open position without hydraulic fluid being forced from the hydraulic actuator and without hydraulic fluid being supplied to the hydraulic actuator such that the hydraulic fluid from the one end of the hydraulic actuator is given a free path therefrom back to the reservoir defining a relaxed position for the hydraulic actuator.

* * * * *